United States Patent

Ballard

(10) Patent No.: US 9,135,124 B2
(45) Date of Patent: Sep. 15, 2015

(54) SEQUENCE INDICATOR FOR COMMAND COMMUNICATED TO A SEQUENTIAL ACCESS STORAGE DEVICE

(75) Inventor: Curtis C Ballard, Eaton, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 352 days.

(21) Appl. No.: 13/459,911

(22) Filed: Apr. 30, 2012

(65) Prior Publication Data

US 2013/0290772 A1 Oct. 31, 2013

(51) Int. Cl.
*G06F 11/00* (2006.01)
*G06F 11/20* (2006.01)
*G06F 11/14* (2006.01)
*G06F 11/07* (2006.01)

(52) U.S. Cl.
CPC ............ *G06F 11/20* (2013.01); *G06F 11/0727* (2013.01); *G06F 11/1443* (2013.01); *G06F 11/2007* (2013.01)

(58) Field of Classification Search
CPC ..... G06F 11/0727; G06F 11/076; G06F 1/28; G06F 1/30; G06F 11/201; G11B 19/047; H04B 17/02; H04L 1/24; H04L 29/06; H04L 43/0811; H04L 45/22; H04L 45/245; H04L 45/28; H04L 69/18
See application file for complete search history.

(56) References Cited

U.S. PATENT DOCUMENTS

| | | | | |
|---|---|---|---|---|
| 5,293,576 A * | 3/1994 | Mihm et al. | ................ | 713/170 |
| 5,712,971 A * | 1/1998 | Stanfill et al. | ................ | 714/34 |
| 5,768,162 A * | 6/1998 | Rupp et al. | ................ | 702/186 |
| 5,917,840 A * | 6/1999 | Cheney et al. | ................ | 714/807 |
| 6,185,203 B1 * | 2/2001 | Berman | ................ | 370/351 |
| 6,431,315 B1 * | 8/2002 | Lewis | ................ | 182/92 |
| 6,816,917 B2 | 11/2004 | Dicorpo et al. | | |
| 6,938,091 B2 * | 8/2005 | Das Sharma | ................ | 709/230 |
| 7,024,591 B2 * | 4/2006 | Moody et al. | ................ | 714/43 |
| 7,134,040 B2 | 11/2006 | Ayres | | |
| 7,477,606 B2 * | 1/2009 | Mahasoom et al. | ........ | 370/237 |
| 7,644,318 B2 | 1/2010 | Dicorpo et al. | | |
| 7,707,456 B2 * | 4/2010 | Tanaka et al. | ................ | 714/6.11 |
| 7,992,048 B2 | 8/2011 | Komatsu et al. | | |
| 2001/0019536 A1 * | 9/2001 | Suzuki | ................ | 370/226 |
| 2001/0034791 A1 * | 10/2001 | Clubb et al. | ................ | 709/238 |
| 2002/0065962 A1 * | 5/2002 | Bakke et al. | ................ | 710/38 |
| 2002/0116564 A1 * | 8/2002 | Paul et al. | ................ | 710/301 |
| 2002/0129312 A1 * | 9/2002 | Sipola | ................ | 714/748 |
| 2003/0172181 A1 * | 9/2003 | Sharma | ................ | 709/238 |
| 2003/0187987 A1 * | 10/2003 | Messick et al. | ........... | 709/226 |
| 2003/0233154 A1 * | 12/2003 | Kobziar | ................ | 700/13 |
| 2005/0081080 A1 * | 4/2005 | Bender et al. | ................ | 714/2 |
| 2007/0121638 A1 * | 5/2007 | Szczebak et al. | .......... | 370/394 |
| 2007/0242689 A1 * | 10/2007 | Zavadsky et al. | .......... | 370/464 |
| 2008/0091972 A1 * | 4/2008 | Tanaka et al. | ................ | 714/5 |
| 2010/0083061 A1 * | 4/2010 | Coronado et al. | ........... | 714/708 |

* cited by examiner

*Primary Examiner* — Amine Riad
(74) *Attorney, Agent, or Firm* — Trop, Pruner & Hu, P.C.

(57) ABSTRACT

A command is communicated by a computer and received by a sequential storage access device. The command includes a sequence indicator. The sequential storage access device uses the sequence indicator, in a communication path failure recovery operation, to at least determine whether a command has been confirmed by the device driver as being processed by the sequential access storage device.

20 Claims, 6 Drawing Sheets

SEQUENCE INDICATOR FOR COMMAND COMMUNICATED TO A SEQUENTIAL ACCESS STORAGE DEVICE

BACKGROUND

A tape drive may be used for such purposes as storing backup data for a computer and providing data to the computer in a recovery operation in the event that the computer experiences data corruption, data loss, and so forth. The tape drive typically reads data from/writes data to media that is formed from a strip, or tape, of magnetically sensitive material, which is moved by the tape drive's motor relative to the tape drive's read/write head. In this manner, the read/write head contacts the tape at different positions as the tape moves relative to the head to read data from or write data to these different positions. The tape drive is an example of a sequential access storage device: data is written to/read from the tape in a sequential fashion from the starting position to the end of the tape or until the operation is complete.

DETAILED DESCRIPTION

Figure 1:
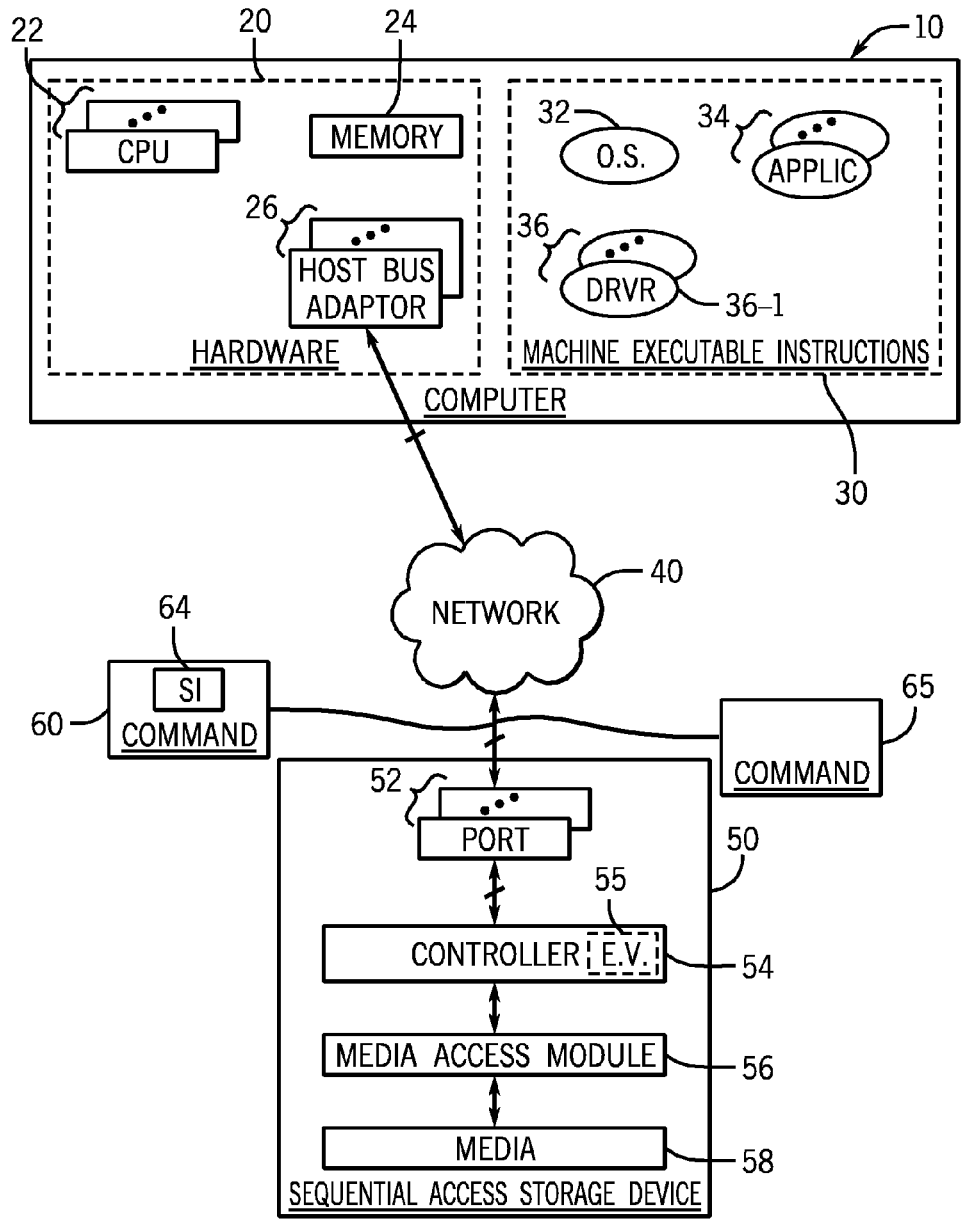
FIG. 1 is a schematic diagram of a computer-based system according to an example implementation.

Referring to FIG. 1, in accordance with example implementations, a computer-based system includes a computer 10 that, for such purposes as storing/restoring backup data and other purposes, may access one or multiple sequential access storage devices, such as a sequential storage access device 50 (a tape drive, for example). More specifically, for the examples, which are disclosed herein, the computer 10 may access the sequential access storage device 50 over a selected communication path, which may be formed in part by a network 40; and this access may involve the communication of commands and data over the selected communication path.

For example, the computer 10 may, via the selected communication path, communicate data to be stored on the sequential storage access device 50 and communicate commands to the device 50 for such purposes as instructing the device 50 to perform actions or inquire about a status of device 50. As a more specific example, the commands that are generated by the computer 10 and communicated to the sequential storage access device 50 may include commands to read data from the device 50, erase data from the device 50, write data to the device 50, format media of the device 50, rewind media of the device 50, and so forth. As further described herein, the computer 10 may communicate commands to the sequential storage access device 50. One type of command is a notification to change the selected communication path. The sequential storage access device 50 may communicate data and various responses over the selected communication path to the computer 10 to inform the computer 10 about statuses, errors, and so forth.

For purposes of issuing the commands, responding to statuses and, in general, controlling operation of the sequential storage access device 50 from the standpoint of the computer 10, the computer 10 includes a set of machine executable instructions, which, when executed by the computer 10, form a device driver 36-1.

The device driver 36-1 may communicate with the sequential access storage device 50 using one of one or multiple communication paths. For purposes of maintaining the computer-based system in a stable state, techniques and systems are disclosed herein to address failover concerns should the currently selected communication path fail (a fiber optic line may be cut, a switch may fail, and so forth).

The failure of the currently selected communication path may occur at an inopportune time, such as, after the device driver 36-1 issues a command to the sequential access storage device 50 but before the device driver 36-1 receives confirmation from the device 50 that the command was successfully processed by the device 50; during the communication of data over the failed communication between the device driver 36-1 and the device 50; before the device 50 receives a command sent by the device driver 36-1; and so forth.

As a more specific example, the driver 36-1 may generate, or issue, a write command, which is communicated to the network 40 for purposes of writing data to the sequential access storage device 50; and the currently selected communication path, for this example, may fail before the device 50 confirms to the device driver 36-1 that the write command has been processed by the device 50. Although the driver 36-1 may, in response to the communication path failure, select an alternative communication path for communications with the sequential access storage device 50, the mere communication or re-communication of the write command does not ensure that the device 50 has received and/or actually processed the write command. Therefore, the position of the sequential storage access device's media is undetermined and the device driver 36-1 and the sequential access storage device 50 may share different statuses regarding the processing of the write command, if not for the features that are described herein.

In accordance with example implementations that are disclosed herein, to permit failover recovery should the currently selected communication path between the driver 36-1 and the sequential access storage device 50 fail, the driver 36-1 includes a sequence indicator 64 in each media access command 60 that is communicated to the device 50. In this context, a "media access command" refers to a command for the sequential access storage device 50, which causes media 58 of the sequential access storage device 50 to move or be modified. In this manner, unlike a random access device, the sequential access storage device 50 cannot jump from one position on the media 58 to a different position without first properly positioning the media 58 before a media access command 60 is executed by the sequential storage access device 50. Therefore, due to the movement in media position, if the command status shared by the device driver 36-1 differs from the command status that is shared by the sequential access storage device 50 after a communication path failure, errors may result due to media position discrepancies.

In accordance with some implementations, whether or not a command is a media access command 60 depends on the action to be taken by the sequential access storage device 50 in response to completing the command. For example, a write attribute command may cause a particular sequential access storage device 50 to write an attribute to its media 58 and as such, is considered to be a media access command for the device. However, another sequential access storage device 50 may, in response to a write attribute command, write an attribute to its flash memory instead of writing the attribute to its media 58; and therefore, the write attribute command for this sequential access storage device 50 is not considered to be a media access command.

In addition to media access commands 60, the driver 36-1 may communicate non-media access commands 65 (a status inquiry command, for example) to the sequential access storage device 50, which does not cause the media 58 of the sequential access storage device 50 to move or be modified.

To further illustrate how these errors may occur due to media position discrepancies, a write command may be issued by the device driver 36-1 to write a certain number of bytes to the media 58 of the sequential access storage device 50. In the absence of a communication path failure, the sequential access storage device 50 responds to the write command and begins writing the received data as the media 58 is moved underneath the device's read/write head. The sequential access storage device 50 notifies the device driver 36-1 upon the successful completion of the write command. However, if a failure occurs in the communication path occurs before the sequential access storage device 50 completes processing the write command, the media 58 may be left in an indeterminate position.

For example, the communication path may fail immediately after the write command is sent but before the device driver 36-1 sends any data. Therefore, no data is received by the sequential access storage device 50 in this scenario; and the media 58 remains in its initial position, although without the benefit of the command response, the device drive 36-1 is unaware of the media 58 being in the initial position. As another example, the selected communication path may fail after all of the data is written to the media 58 but before the device driver 36-1 receives a response indicating successful completion of the write command. As a result of this scenario, the media 58 may be in the same position as it would have been had the command completed successfully, although, without the benefit of the command response, the device drive 36-1 is unaware of the successful completion. As another example, the selected communication path may fail after some, but not all, of the data has been written to the media 58. Under this scenario, the communication path failure leaves the media 58 in an indeterminate position between the initial position and the successfully completed position.

The sequence indicator 64 indicates a particular order in which the media access commands 60 are communicated to the sequential access storage device 50. This order, in turn, allows the sequential access storage device 50 to detect whether a sequence counter is a duplicate to identify whether a given media access command 60 has been received by the device 50. The sequential access storage device 50 receives the next sequence count, which allows the device 50 to further identify whether a media access command 60 that has been received by the sequential access storage device 50 has been confirmed at the device driver 36-1 as being processed by the sequential access storage device 50. With such knowledge of the sequence of the media access commands and the command status, as conveyed through the sequence indicator 64, if a path failure occurs, the sequence indicator 64 allows the sequential access storage device 50 to undertake an appropriate failover recovery operation to ensure that both the device drive 36-1 and the sequential access storage device 50 share the same command status.

It is noted that although implementations are disclosed specifically herein in which the sequential access storage device 50 performs the failover recovery operation, in further implementations, the device driver 36-1 may perform the failover recovery operation. In this manner, for these implementations, the device driver 36-1 uses its knowledge of the position information and the existing standard commands for managing the position on the sequential access storage device 50 to send commands to the device 50 to cause the device 50 to change to the position necessary for resuming operation. Thus, regardless of whether the sequential access storage device 50 or the device driver 36-1 initiates the actions to perform the failover recovery operation, the failover recovery operation uses the command status synchronization that is allowed by the sequence indicator 64.

It is noted that recovery from a communication path failure may not be achieved by the device driver 36-1 merely resending any outstanding commands (i.e., commands for which the device driver 36-1 has not received processing confirmation from the sequential storage access device 50), as the actual position of the media 58 by the device driver 36-1 is unknown, without other measures being undertaken. Moreover, the device driver 36-1 may be unaware of the type of failure that has occurred and also may not be aware of the current position of the sequential storage access device's media 58. Furthermore, the device driver 36-1 may not be able to reposition the media 58 to the correct position, without additional information or interaction with the sequential storage access device 50.

Due to the use of the sequence indicator 64 for media access command 60, however, the sequential access storage device 50 and the device driver 36-1 are able to detect differences in the command status, thereby allowing the sequential access storage device 50 or the device driver 36-1 to perform a failover recovery operation when the sequential access storage device 50 is notified about a communication path failure.

As a non-limiting list of examples, a "media access command" may be any of the following commands that cause the sequential access storage device 50 to move the media 58: an ERASE command, a FORMAT medium command, a LOCATE command, a READ command, a REWIND command, a SPACE command, a VERIFY command, a WRITE command and a WRITE FILE MARKS command.

Figure 2:
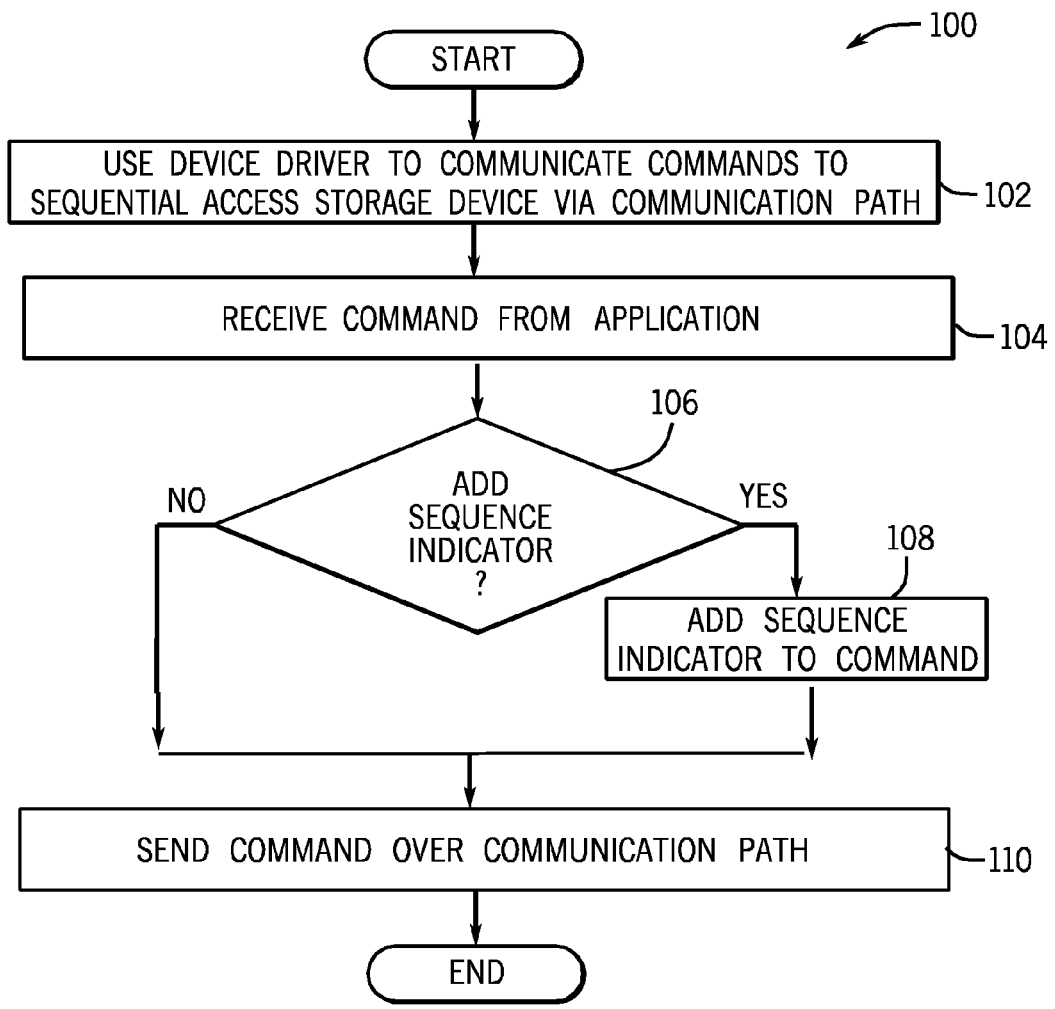
FIG. 2 is a flow diagram depicting a technique to communicate commands to a sequential access storage device according to an example implementation.

Referring to FIG. 2, in accordance with example implementations, a technique 100 includes using a device driver to communicate commands to a sequential access storage device via a communication path, pursuant to block 102. The technique 100 includes the device driver receiving (block 104) a command from an application and determining (decision block 106) whether a sequence is to be added to the command. In this regard, if the command is a media access command, then the device driver adds (block 108) a sequence indicator to the command. The command (with or without the sequence indicator) has been sent over the communication path, pursuant to block 110. As further disclosed herein, the sequence indicator allows the sequential access storage device to, in a communication path failure recovery operation (also called a "failover recovery operation"), identify at least whether one of the commands has not been confirmed at the device driver as being processed by the sequential access storage device. Moreover, as further described herein, the sequential indicator also permits the sequential access storage device to determine whether a given command has not been received by the device.

Referring back to FIG. 1, in general, the computer 10 may be a "physical machine," or an actual machine that is made up of machine executable instructions 30 (i.e., "software") and hardware 20. Although the computer 10 is represented in FIG. 1 as being contained within a box, the computer 10 may be a distributed machine, which has multiple nodes that provide a distributed and parallel processing system. In accordance with some implementations, the physical machine may be located within one cabinet (or rack); or alternatively, the physical machine may be located in multiple cabinets (or racks).

The computer 10 may include such hardware 20 as one or more central processing units (CPUs) 22 and a memory 24 that stores the machine executable instructions 30, application data, configuration data and so forth. In general, the memory 24 is a non-transitory memory, which may include semiconductor storage devices, magnetic storage devices, optical storage devices, and so forth. The computer 10 further includes one or multiple host bus adaptors 26, which the computer uses 10 to communicate with one or multiple sequential access storage devices, such as the sequential access storage device 50. It is noted that the computer 10 may include various other hardware components, such as one or more of the following: mass storage devices, display devices, input devices (a mouse and a keyboard, for example), and so forth. In accordance with example implementations, at least part of the machine executable instructions 30 may be executed in one or multiple virtual machines of the computer 10.

For implementations that use the network 40, the network 40 may be a network fabric which may include one or more buses or fast interconnects. In this regard, the network 40 may include wide area network (WAN) connections, local area network (LAN) connections, wireless connections, Internet connections, and so forth. In general, one or multiple protocols may be used in the communications over the network 40, and these communications may involve such protocols as a serial attach Small Computer System Interface (SCSI) bus protocol, a parallel SCSI protocol, a SCSI for Internet (iSCSI) protocol, a Universal Serial Bus (USB) protocol, a Fibre Channel protocol, an Ethernet protocol, and so forth.

The machine executable instructions 30 of the computer 10, in general, may include device drivers 36 other than the device driver 36-1, as well as other sets of machine executable instructions that form corresponding applications 34. In general, one or multiple applications 34 may generate data through an application programming interface (API) of an operating system 32 of the computer 10 for purposes of causing the device driver 36-1 to respond by communicating with the sequential access storage device 50.

In general, the sequential access storage device 50 includes one or multiple ports 52, which are coupled to the network 40 to communicate commands, data and statuses with the device driver 36-1 over a selected communication path. In this manner, the device driver 36-1 may communicate with the sequential access storage device 50 over a selected communication path that is formed by one of the host bus adaptors 56, the network 40 and one of the ports 52. Thus, in accordance with example implementations, the particular combination of a host bus adaptor 56 and port 52 defines a given communication path between the device driver 36-1 and the sequential access storage device 50.

As a non-limiting example, in accordance with some implementations, the SCSI protocol may be used for communications over the network 40. For these communications, an "initiator" (such as a given host bus adapter 56 port under the control of the device driver 36-1, for example) issues a given SCSI command to request services from a "target" of the command. The target, in turn, includes a logical unit (LU), which accepts and processes the SCSI command. It is noted that given target may include multiple LUs. In general, a communication path is defined by a given initiator-target-logical unit nexus (herein called an "ITL nexus").

Thus, a different combination of the host bus adaptor 26 and port 52 specifies a different ITL nexus and correspondingly specifies a different communication path. The device driver 36-1 may deem that the currently selected communication path has failed by, as examples, waiting for a predetermined time interval without receiving an expected response from the sequential access storage device 50 or receiving an error indication from the host bus adaptor 26. When this occurs, the device driver 36-1 selects another ITL nexus, i.e., selects an alternate communication path, for communications between the device driver 36-1 and the sequential access storage device 50.

A controller 54 of the sequential access storage device 50 receives media access commands and other commands that are issued by the device driver 36-1 and controls a media access module 56 accordingly for purposes of moving the media 58 to the appropriate position and performing the commands (writing data, reading data, and so forth). As a non-limiting example, the sequential access storage device 50 may be a tape storage device, the media 58 may be magnetic tape media of the sequential access storage device 50, and the media access module 56 may include the motor, read/write head, and so forth of the sequential storage access device 50.

In accordance with some implementations, the sequence indicator 64 is a two bit code whose value indicates a cyclical count to identify an order of the three most recently communicated media access commands; and as a more specific example, the two bit code may have one of the following three values: 01b, 10b and 11 b, where "b" represents a binary representation.

In general, the device driver 36-1 regulates the issuing of the media access commands 60 to the sequential access storage device 50 such that a single media access command 60 is outstanding at any one time. When the outstanding media access command 60 is acknowledged as being completed via a status reply from the sequential access storage device 50, the device driver 36-1 increments a sequential indicator counter that is maintained by the device driver 36-1 and stores the corresponding value (i.e., the value indicated by the sequence indicator 64) in the next media access command 60 that is issued by the device driver 36-1. Other variations are contemplated, which are within the scope of the appended claims. For example, in further implementations, the sequence indicator 64 may be a three bit counter that allows two or three commands at one time to be outstanding.

In accordance with an example implantation, the controller 54 stores an expected value 55 for the sequence indicator 64 of the next received media access command 60 and uses the expected value 55 to detect errors as well as perform a failover recovery operation in the event of a communication path failure, as further described herein. The expected value 55 cycles according to the sequence used for the sequence indicator 64: 01b, 10b and 11b.

The controller 54 compares the expected value 55 of its sequential access counter to the sequence indicator 64 of a given media access command 60 for purposes of determining whether a particular media access command 60 has been lost. In this manner, if the expected value 55 agrees with the value indicated by the sequence indicator of the most recently received media access command 60, then the controller 54 proceeds to process the command 60 and increment its expected value 55 to be used in the processing of the next received media access command 60. If, however, the expected value 55 is different from the value that indicated by the sequence indicator 64, the controller 54 replies with an error status to the device driver 36-1.

The sequence indicator 64 and the expected value 55 are further used in a failover recovery operation that is performed by the sequential storage access device 50. In this manner, the controller 54 uses the expected value 55 in conjunction with a sequence indicator of a communication path change notification command, as further described below, for purposes of determining whether the device driver 36-1 and the sequential access storage device 50 share the command status and for purposes of performing a failover recovery operation to restore the status to a common state.

Figure 3:
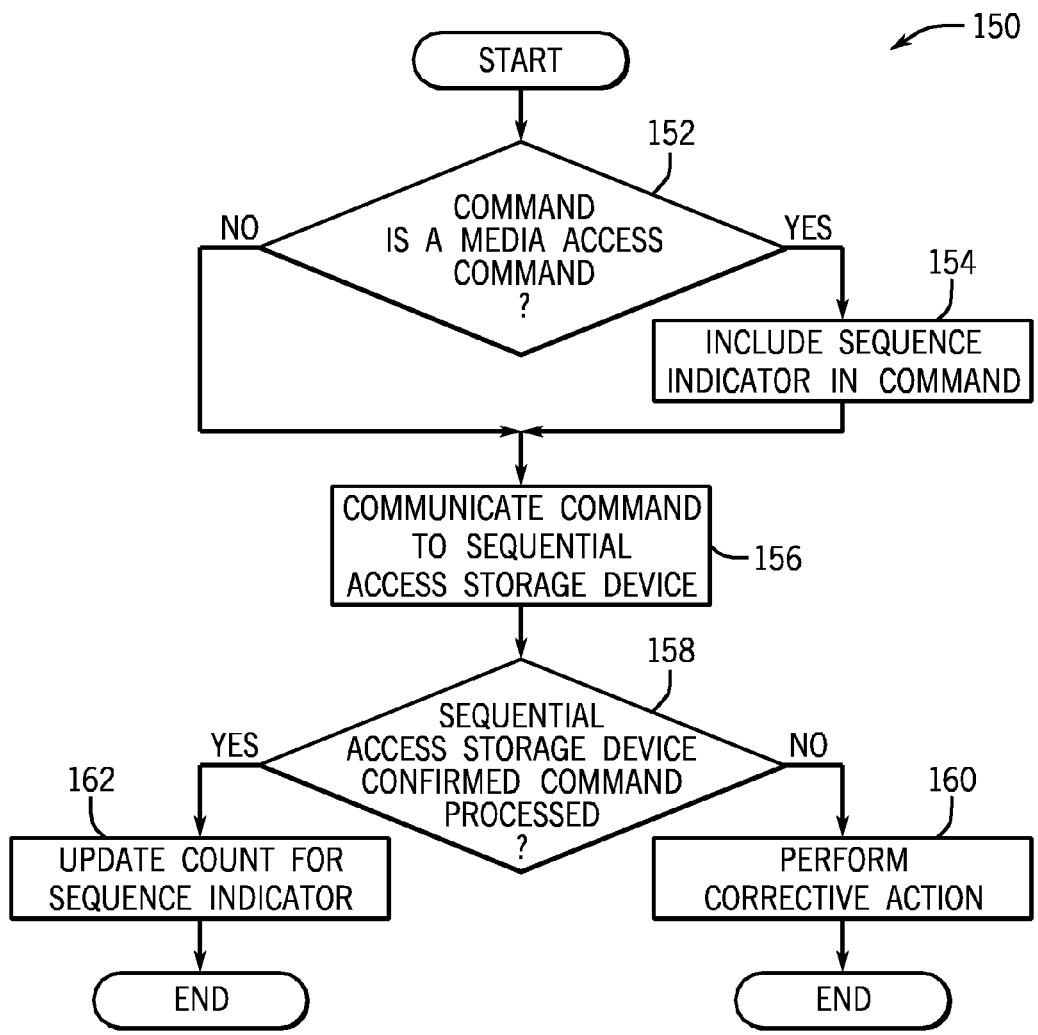
FIG. 3 is a flow diagram depicting a technique used by a device driver of FIG. 1 to include a sequence indicator in a media access command according to an example implementation.

As a more specific example, FIG. 3 depicts an example of a technique 150 used by the device driver 36-1 to process commands. Pursuant to the technique 150, the device driver 36-1 determines (decision block 152) whether a given command to be issued to the sequential access storage device is a media access command. If so, the device driver 36-1 includes (block 154) a sequence indicator 64 into the command. Otherwise, the device driver 36-1 does not include the sequence indicator in a non-media access command 65 (i.e., a command that does not cause the media of the sequential storage access device 50 to move when the command is processed), as merely repeating a non-media access command 65 does not change the position of the media 58 and as such, may be resubmitted after a communication path failure without introducing error into the system. It is noted that the non-media access commands 65 do not include the sequence counter 61. Pursuant to the technique 150, after the selective inclusion of the sequence indicator 64 into the command, the command is communicated (block 156) by the device driver 36-1 to the sequential storage access device.

In accordance with example implementations, the device driver 36-1 regulates the issuance of the media access commands 60 to the sequential access storage device 50 one at a time, although one or multiple non-media access commands 65 may be issued to the sequential access storage device 50 between two successively-issued media access commands 60 or while a media access command 60 is being processed, in accordance with some implementations.

After issuing a media access command 60, the device driver 36-1 waits for a confirmation from the sequential access storage device 50 regarding whether the device 50 has successfully processed the command 60. If the device driver 36-1 determines (decision block 158) that the media access command 60 was successfully processed, then the device driver 36-1 updates (block 162) its count for the sequence indicator 64. Otherwise, if the device driver 36-1 determines (decision block 158) that the sequential access storage device 50 did not process the media access command (the device driver 36-1 receives an error message from the host bus adaptor 26, for example), then the device driver 36-1 performs the appropriate corrective action, pursuant to block 160.

Figure 4:
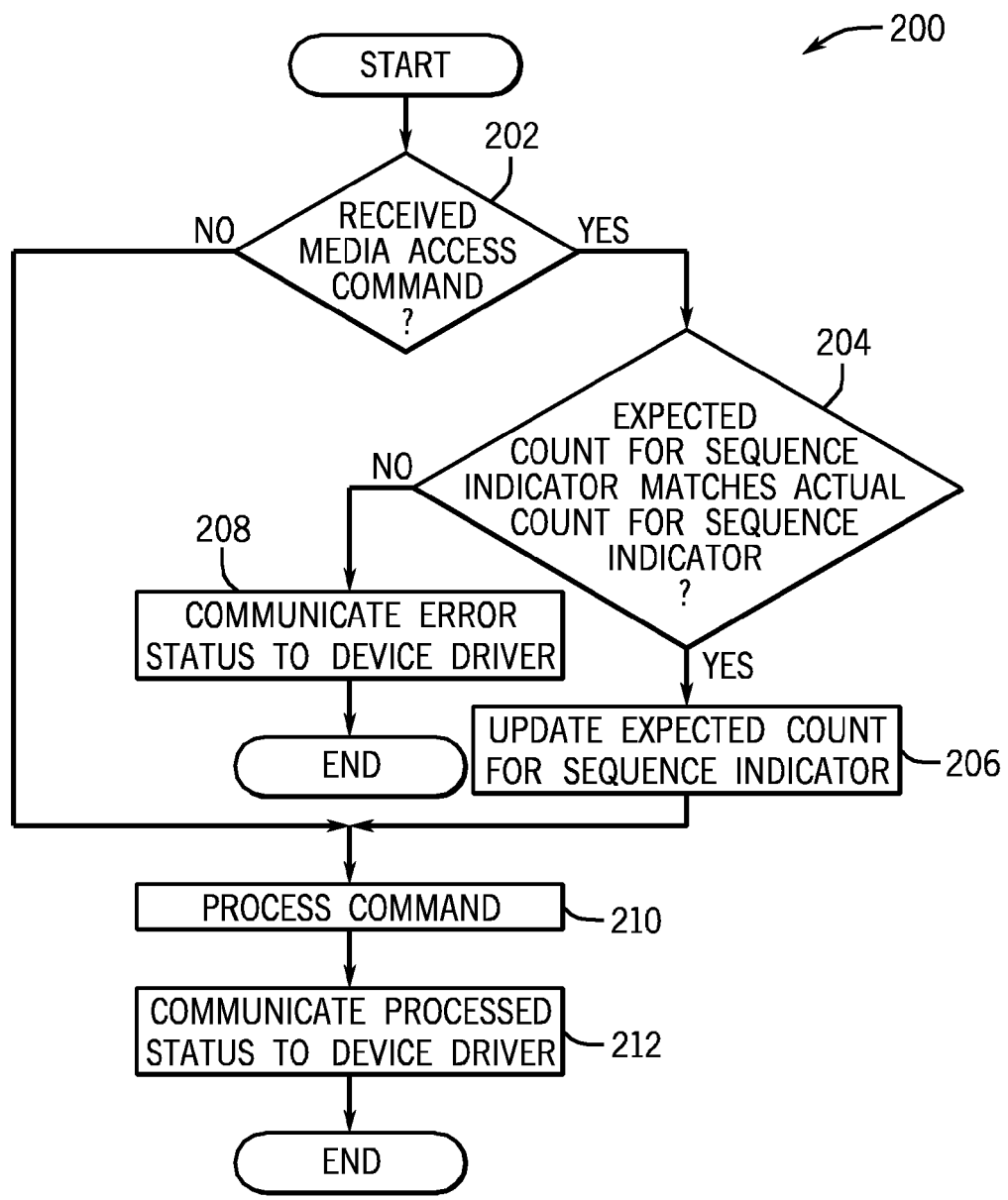
FIG. 4 is a flow diagram depicting a technique used by the sequential access storage device of FIG. 1 to process commands received from the device driver according to an example implementation.

FIG. 4 depicts an example technique 200 employed by the sequential access storage device 50 in accordance with some implementations for purposes of processing received commands during normal, non-failover operation. Pursuant to the technique 200, the controller 54 determines (decision block 202) whether a received command is a media access command 60. If so, the controller 54 determines (decision block 204) whether the expected count for the sequential indicator matches an actual count, as indicated by the sequential indicator. If so, the controller 54 proceeds to update (block 206) the expected count for the sequential indicator and process the command, pursuant to block 210.

Otherwise, the controller 54 communicates (block 208) the error status to the device driver 36-1. It is noted that, pursuant to the technique 200, if the received command is not a media access command, the controller 54 proceeds to processing the command, pursuant to block 210. After the controller 54 processes the command, including processing any data associated with the command, the controller 54 communicates (block 212) the processed status to the device driver 36-1.

Figure 5:
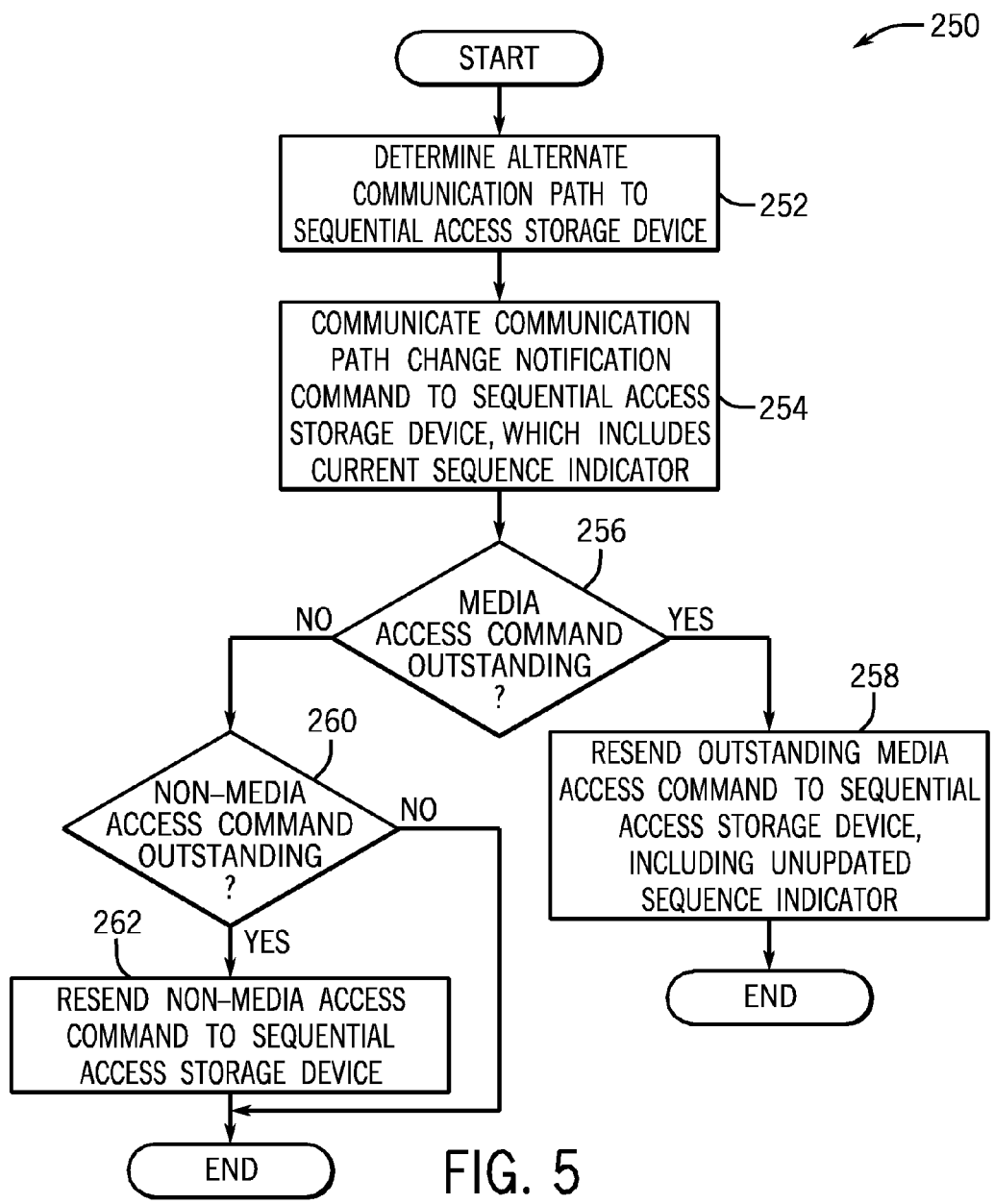
FIG. 5 is a flow diagram depicting a failover recovery technique used by the device driver of FIG. 1 according to an example implementation.

Upon detecting a communication path failure, the device driver 36-1 performs a technique 250 that is generally depicted in FIG. 5, in accordance with example implementations. Pursuant to the technique 250, the device driver 36-1 determines (block 252) an alternate communication path for communications with the sequential access storage device 50, and using this alternate communication path, the device driver 36-1 communicates (block 254) a communication path change notification command to the sequential access storage device 50, which includes the current sequence indicator.

Figure 6:
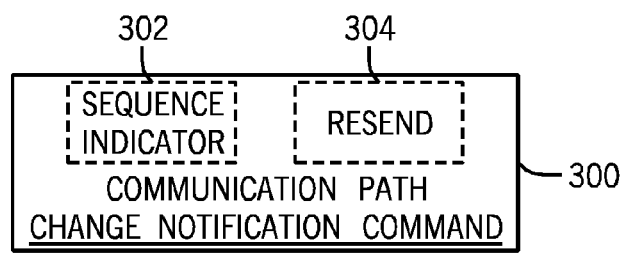
FIG. 6 is a schematic diagram of a communication path change notification command according to an example implementation.

In this manner, referring also to FIG. 6 in conjunction with FIG. 5, in accordance with example implementations, a communication path change notification command 300 includes a current sequence indicator 302, which is the sequence indicator associated with the last command issued by the device driver 36-1. It is noted that the communication path change notification command 300 may include data indicative of other instruction, such as a key or identifier that identifies the failed ITL nexus between the sequential access storage device 50 and device driver 36-1; a header identifying the command 300, and so forth. As another example, the communication path change notification command 300 may indicate a value, such as a key registered with the drive, which may be used to identify the host or may be a value such as a worldwide name that identifies the previous nexus.

Depending on the timing of the failure, the device driver 36-1 may or may not have received confirmation from the sequential access storage device 50 that the device 50 processed the associated media access command. As a result, the communication path change notification command 300 may or may not indicate, via a resend field 304 of the command 300, whether or not the device driver 36-1 is resending the command associated with the sequence indicator 302.

For example, if the device driver 36-1 did not receive confirmation, then the resend field 304 indicates device driver 36-1 will be resending the command, in accordance with example implementations. As another example, if the device driver 36-1 has received confirmation of the most recent media access command 60, then the device driver 36-1 indicates, via the resend field 304, that the command will not be resent and that the indicated sequence count is the sequence count for the next command that will be sent.

Still referring to FIG. 5, thus, pursuant to the technique 250, if the device driver 36-1 determines (decision block 256) that a media access command is outstanding (i.e., the device driver 36 has not received a confirmation that the media access command has been processed by the sequential access storage device 50), then the device driver 36-1 resends (block 258) the outstanding media access command 60 to the sequential storage access device; and this resent command includes an unupdated sequence indicator as part of the command.

If a media command is not outstanding, the device driver 36-1 determines (diamond 260) whether a non-media access command 65 is outstanding, pursuant to decision block 260 and if so, resends (block 262) the non-media access command 65. It is noted that in accordance with some implementations, a media access command as well as a non-media command may be outstanding, and the device driver 36-1 may correspondingly resend both of these commands. Thus, many implementations are contemplated, which are within the scope of the appended claims.

Figure 7:
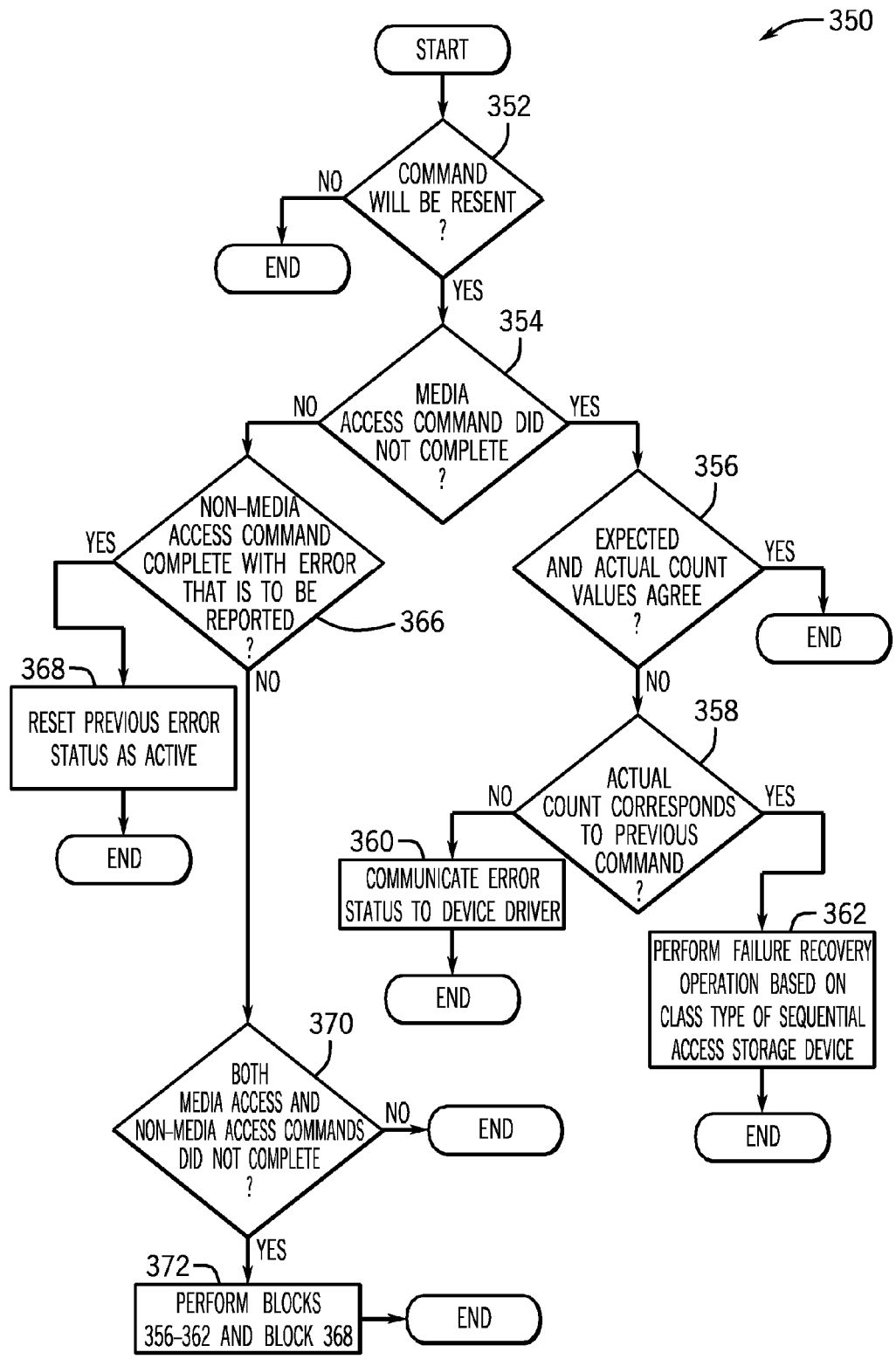
FIG. 7 is a flow diagram depicting a failover recovery technique used by the sequential access storage device of FIG. 1 according to an example implementation.

In accordance with example implementations, the sequential access storage device 50 performs a technique 350 (see FIG. 7) in response to receiving a communication path change notification command 300 (see FIG. 6). As part of processing this command, the storage controller 54 processes the sequence indicator 302 of the command 300 and the resend field 304 (see FIG. 6) of the communication path change notification command, in accordance with exemplary implementations. In this manner, pursuant to the technique 350, the storage controller 54 determines (decision block 352) whether the communication path change notification command 300 indicates whether the command that is associated with the sequence indicator 302 will be resent.

If the communication path change notification command 300 indicates that a command will not be resent, the storage controller 54 terminates its failover processing, as no further action is needed on behalf of the sequential storage access device 50. Otherwise, if the communication path change notification command 300 indicates that a command will be resent, the storage controller 54 determines (decision block 354) whether a media access command 60 did not complete, as also indicated by the resend field 304.

If a media access command 60 did not complete, the storage controller 54 determines (decision block 356) whether the expected count value maintained by the controller 54 agrees with the sequence indicator 304 of the communication path charge notification command 300. If so, then the failed command was not received by the sequential access storage device 50, and no further action is taken by the storage controller 54. If, however, the expected and actual count values do not agree (pursuant to decision block 356), then the storage controller 54 determines (decision block 358) whether the actual count corresponds to the immediately previous command. If so, the storage controller 54 performs (block 362) a failure recovery operation based on the class type of the sequential access storage device 50.

For example, in accordance with some implementations, if the sequential access storage device 50 is a SCSI stream command (SSC) device, the storage controller 54 repositions the device 50 to the starting position.

Otherwise, pursuant to the technique 350, if the storage controller 54 determines (decision block 358) that the actual count does not correspond to the previous command, then the storage controller 54 communicates (block 360) the corresponding error status to the device driver 36-1.

If, pursuant to the technique 350, the storage controller 54 determines (decision block 366) that the resend field 304 indicates that the non-media access command 65 completed with an error to be reported, then the storage controller 54 sets (block 368) a previous error notification as active ready to be reported on the next command, if applicable. If the storage controller 54 determines (decision block 370) that the resend field 304 indicates that both a media access and a non-media access command 65 did not complete, the storage controller 54 performs (block 372) blocks 358-362 and block 368 for purposes of processing these commands.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   using a device driver of a computer to communicate a plurality of commands received by a sequential access storage device via a communication path;
   selectively including a sequence indicator in at least one of the commands based on whether the command is a media access command; and
   regulating the sequence indicator to allow the sequential access storage device to use the sequence indicator to determine in a communication path failure recovery operation whether a command of the plurality of commands has not been confirmed at the device driver as being processed by the sequential access storage device.

2. The method of claim 1, wherein the indicator is further used by the sequential access storage device to identify whether a command of the plurality of commands has not been received by the sequential access storage device.

3. The method of claim 1, wherein the indicator is further used by the sequential access storage device to identify at least one of whether a command of a plurality of commands has been received but not completed and whether a command of the plurality of commands has been received and completed.

4. The method of claim 1, wherein the plurality of commands comprises a first set of at least one command that results in movement or modification of media of the sequence access storage device, and selectively including comprises including the sequence indicator in at least one of the commands of the first set.

5. The method of claim 1, wherein selectively including the sequence indicator comprises including a counter value in each of the commands that is a media access command.

6. The method of claim 4, wherein the commands are communicated to the sequential access storage device in a sequence, and regulating the sequence indicator comprises selectively incrementing the sequence indicator that will be used for a subsequent media access command based on whether a status received from the sequential access storage device indicates that a previously communicated media access command has been processed by the sequential access storage device.

7. The method of claim 1, further comprising:
   in response to a failure to receive a status indicating that a command has been processed by the sequential access storage device, selecting another communication path, and using the sequence indicator to synchronize media position information between the device driver and the sequential access storage device, wherein the failure recovery operation is performed by the sequential access storage device or the device driver.

8. The method of claim 7, further comprising:
   including in the command communicated over the another communication path an indication whether a command was not confirmed as being completed at the device driver and will be resent over the another communication path to the sequential access storage device.

9. An article comprising a computer readable storage medium to store instructions that when executed by a computer cause the computer to:
   communicate a plurality of commands via a communication path to a sequential access storage device;
   selectively include a sequence indicator in at least one of the commands based on whether the command is a media access command; and regulate the sequence indicator to allow the sequential access storage device to determine, in a path failure recovery operation, whether a command of the plurality of commands has not been confirmed at a device driver as being processed by the sequential access storage device.

10. The article of claim 9, wherein the indicator is further used by the sequential access storage device to identify whether a command of the plurality of commands has not been received by the sequential access storage device.

11. The article of claim 9, wherein the indicator is further used by the sequential access storage device to identify at least one of whether a command of a plurality of commands has been received but not completed and whether a command of the plurality of commands has been received and completed.

12. The article of claim 9, wherein the plurality of commands comprises a first set of at least one command that results in movement or modification of media of the sequence access storage device, and the storage medium storing instructions that when executed by the computer cause the computer to include the sequence indicator in at least one of the commands of the first set.

13. The article of claim 12, wherein the commands are communicated to the sequential access storage device in a sequence, the storage medium storing instructions that when executed by the computer cause the computer to:
selectively increment the counter value for a given media access command based on whether the sequential access storage device returns a status indicating that a previously communicated media access command has been processed by the sequential access storage device.

14. The article of claim 9, the storage medium storing instructions that when executed by the computer cause the computer to:
in response to a failure to receive a status indicating that a command has been processed by the sequential access storage device, select another communication path, and use the sequence indicator to synchronize media position information between the device driver and the sequential access storage device, wherein the failure recovery operation is performed by the sequential access storage device or the device driver.

15. The article of claim 14, the storage medium storing instructions that when executed by the computer cause the computer to:
including in the command communicated over the another communication path an indication whether the command not confirmed as being completed at the device driver and will be resent over the another communication path to the sequential access storage device.

16. An apparatus comprising:
a media access module; and
a controller to:
receive a command communicated by a computer to change a communication path between the apparatus and the computer and receive a sequence indicator in the received command; and
use the sequence indicator in a communication path failure recovery operation to determine at least whether a media access command has been confirmed at the computer as being processed by the apparatus.

17. The apparatus of claim 16, wherein the controller is adapted to selectively reset a media position of the media access module based on the determination.

18. The apparatus of claim 16, wherein the controller is adapted to use the sequence indicator to determine whether the media access command has been received by the apparatus.

19. The apparatus of claim 16, wherein the controller is adapted to maintain an expected sequence indicator and compare the received sequence indicator to the expected sequence indicator to determine at least whether a media access command has been confirmed at the computer as being processed by the apparatus.

20. The apparatus of claim 16, further comprising a tape storage device comprising the media access module and the controller.

* * * * *